(12) United States Patent
Sommerfeld et al.

(10) Patent No.: US 12,446,491 B2
(45) Date of Patent: *Oct. 21, 2025

(54) SWATH LIFTER

(71) Applicant: Aerow Manufacturing Ltd., Saskatoon (CA)

(72) Inventors: Ryan Ray Sommerfeld, Medstead (CA); Ben K. Voss, Saskatoon (CA)

(73) Assignee: Aerow Manufacturing Ltd., Saskatoon (CA)

( * ) Notice: Subject to any disclaimer, the term of this patent is extended or adjusted under 35 U.S.C. 154(b) by 635 days.

This patent is subject to a terminal disclaimer.

(21) Appl. No.: 17/421,485

(22) PCT Filed: Jun. 19, 2020

(86) PCT No.: PCT/CA2020/050855
§ 371 (c)(1),
(2) Date: Jul. 8, 2021

(87) PCT Pub. No.: WO2021/003557
PCT Pub. Date: Jan. 14, 2021

(65) Prior Publication Data
US 2022/0061220 A1    Mar. 3, 2022

Related U.S. Application Data

(63) Continuation-in-part of application No. 16/506,460, filed on Jul. 9, 2019, now Pat. No. 11,172,616.

(51) Int. Cl.
*A01D 78/00* (2006.01)
*A01D 80/02* (2006.01)

(52) U.S. Cl.
CPC ........... *A01D 78/006* (2013.01); *A01D 80/02* (2013.01)

(58) Field of Classification Search
CPC .. A01D 78/006; A01D 80/02; A01D 78/1042; A01D 34/661; A01D 34/662;
(Continued)

(56) References Cited

U.S. PATENT DOCUMENTS 2,502,599 A * 4/1950 Smart .................... A01D 78/02
56/189
3,059,403 A * 10/1962 Bamford ................ A01D 78/02
56/366
(Continued)

FOREIGN PATENT DOCUMENTS

CA     2642125 A1 *  5/2009  ............. A01D 57/02
HU     9601432 A2 *  5/1997  ........... A01D 34/661

*Primary Examiner* — Christopher J Sebesta
*Assistant Examiner* — Ashley A Kaercher
(74) *Attorney, Agent, or Firm* — Adrian D. Battison; Ade & Company Inc.; Ryan W. Dupuis

(57) ABSTRACT

A swath lifter includes a rotor over which the crop is carried with the rotor driven in a direction so that an underside of the rotor adjacent the ground is driven opposite to the direction of movement. The rotor carries rows of tines at angularly spaced positions around the rotor each associated with a flexible strip of a resilient material located in front of the tines and covering an inner part of the tines with the outer part exposed. The rotor can be arranged with its axis inclined to a line at right angles to the forward direction thus tending to carry the crop to one side to direct the cop onto an adjustable swath guide board to cooperate to form the swath into a desired condition. The rotor can be used as a front member in a pickup for example for a baler.

20 Claims, 12 Drawing Sheets

(58) Field of Classification Search
CPC ... A01D 34/663; A01D 34/664; A01D 34/665
See application file for complete search history.

(56) References Cited

U.S. PATENT DOCUMENTS

| | | | | |
|---|---|---|---|---|
| 3,158,976 A * | 12/1964 | Scheidenhelm | ....... | A01D 57/02 56/220 |
| 3,520,118 A * | 7/1970 | Lausch | ................ | A01D 34/02 56/2 |
| 4,472,928 A * | 9/1984 | Easton | ................ | A01D 57/02 56/220 |
| 4,738,092 A * | 4/1988 | Jennings | ............... | A01D 57/20 56/366 |
| 5,507,139 A * | 4/1996 | Delperdang | ........... | A01D 84/00 56/366 |
| 6,877,304 B1 * | 4/2005 | Smith | ................ | A01F 15/106 56/364 |
| 2011/0225942 A1 * | 9/2011 | McClure | ............ | A01D 89/002 56/364 |

* cited by examiner

SWATH LIFTER

This invention relates to an apparatus for lifting a swath of crop material from the ground.

Such lifting action can be provided for purposes such as aeration so as to open and aerate the crop material in the swath closest to the ground to assist in drying.

The lifting apparatus can also be used for other purposes such as lifting the swath in advance of a pickup, so as provide an improved action of the pickup and reduce crop left in the field when the swath is difficult to lift. This can be done as a separate action by a separate machine in advance of the pickup or can be done as a common process with the pickup where the apparatus runs in front of the pickup. This can also be done instead of a pickup where the lifting apparatus replaces the pickup and performs the same functions feeding crop material into a baler or harvester.

Such pickups can be part of a baler or harvester or any other machine where a previously cut swath is required to be collected for subsequent processing.

BACKGROUND OF THE INVENTION

Often, the purpose of harvesting crops into a swath is to enable the crop material to be dried before feeding to the baler, combine harvester or other machine used to gather crop material. Swathing can be used for hay crops or for field crops and the arrangement herein can be used for any crops which are formed into a swath. It is known that the swath has a tendency to dry from the top down so that the material at the top can become overdried with a tendency to be damaged during handling while material at or close to the ground remains too wet due to moisture at the ground or migrating downwardly. It is desirable to harvest crops at optimal moisture characteristics which preserve quality and minimize damage while also being dry enough to be safely preserved in storage. Machines are provided to lift and/or turn the swath to enable the swath to more homogeneously dry faster.

SUMMARY OF THE INVENTION

According to a first aspect of the invention there is provided an apparatus for lifting a swath comprising:
  a wheeled frame for movement over ground carrying a swath of harvested crop material;
  a support rotor mounted on the frame for rotation around a longitudinal axis of the drum with the axis of the rotor arranged generally transversely across the swath;
  a drive arrangement driving the drum in rotation in a direction so that an underside of the rotor adjacent the ground is driven opposite to the direction of movement of the ground relative to the drum as the rotor moves forwardly;
  a plurality of rows of tines mounted on the rotor for rotation therewith, each row extending longitudinally of the rotor with the rows arranged at angularly spaced positions around the rotor with the tines extending generally outwardly from the rotor;
  a plurality of flexible strips of a resilient material;
  each strip being located in front of a respective one of the rows of tines so that, as the rotor rotates forwardly relative to the ground, the strip is presented to the swath on the ground in advance of the tines;
  each strip extending along the row so as to cover a portion of each tine of the row;
  each strip extending from the rotor to an outer edge of the strip spaced from the rotor and spaced inward of an outer end of the tines so that an outer portion of each tine is exposed beyond the outer edge of the strip and so that an inner portion of the tine is covered by the strip.

According to a second aspect of the invention there is provided an apparatus for lifting a swath comprising:
  a wheeled frame for movement over ground carrying a swath of harvested crop material;
  a support rotor mounted on the frame for rotation around a longitudinal axis of the drum with the axis of the rotor arranged generally transversely across the swath;
  a drive arrangement driving the drum in rotation in a direction so that an underside of the rotor adjacent the ground is driven opposite to the direction of movement of the ground relative to the drum as the rotor moves forwardly;
  a plurality of rows of tines mounted on the rotor for rotation therewith, each row extending longitudinally of the rotor with the rows arranged at angularly spaced positions around the rotor with the tines extending generally outwardly from the rotor;
  wherein the rotor is arranged at an angle that is not perpendicular to the direction of travel so that the swath is carried over the top of the rotor and moved to one side and there is provided a swath guide board arranged so that the swath when moved to one side is thrown against the guide board that guides the behavior of the swath as it drops to the ground.

Preferably the angle of the rotor and the angle of the guide board are arranged so that the swath is compressed rather than spread out.

Preferably the angle of the rotor and the angle of the guide board are arranged to induce some twisting motion into the swath that brings material from the edge or bottom of the swath to the top or a different position.

Preferably the rotor angle and the guide board position are adjustable to change the effect on the swath.

According to a third aspect of the invention there is provided an apparatus comprising:
  a farm implement for collecting crop from a swath comprising:
  an apparatus for lifting a swath comprising:
  a wheeled frame for movement over ground carrying a swath of harvested crop material;
  a support rotor mounted on the frame for rotation around a longitudinal axis of the drum with the axis of the rotor arranged generally transversely across the swath;
  a drive arrangement driving the drum in rotation in a direction so that an underside of the rotor adjacent the ground is driven opposite to the direction of movement of the ground relative to the drum as the rotor moves forwardly;
  a plurality of rows of tines mounted on the rotor for rotation therewith, each row extending longitudinally of the rotor with the rows arranged at angularly spaced positions around the rotor with the tines extending generally outwardly from the rotor;
  wherein the rotor is arranged at an angle that is not perpendicular to the direction of travel so that the swath is carried over the top of the rotor and moved to one side
  where the rotor is mounted in front of the farm implement and it moves along the swath to convey a swath into said implement.

In one arrangement the rotor is carried on a separate machine from the implement and operates on the swath in advance of a pickup of the implement. In other preferred arrangements, the rotor forms the front operating component of a pickup for the implement.

The rotor is arranged so that the swath is carried over the top of the rotor which can then make contact with adjustable swath guide boards or confining elements, when used, which deflect the crop material upwardly or downwardly or direct side edges of the crop inwardly or without direction depending on the level of adjustment of the confining elements or boards.

The rotor can be arranged at an angle that is not perpendicular to the direction of travel so that the swath is carried over the top of the rotor, with the angle then causing the swath to land in a position that is beside its original position, either rightward or leftward of for example between 1 and 4 feet of distance.

The rotor operates to drive the crop up over the rotor and spread and fluff the crop up and as well as narrowing the swath.

The tines are arranged so that the ends of the tines preferably operate and make contact with the ground.

The rotor speed is adjustable by way of modulating the flow of hydraulic oil to the motor driving the rotor.

The rotor and its accompanying frame elements may be lifted relative to the ground by a hydraulic actuator operable by a circuit controlled within the tractor operator station.

According to a fourth aspect of the invention there is provided an apparatus for lifting a swath comprising the rotor, including the rotor pipe with radial pipes and tines along with belting strip, can be used in other situations rather than just in the swath lifter machine as described in detail hereinafter. For example the rotor can be used on balers such as round or square balers where the rotor replaces what is commonly referred to as a pickup. The rotor can pickup a windrow and feed the hay or straw into the baler in the same way a conventional pickup can perform, but the rotor offers several advantages. Key advantages include:

Speed
Handling of heavier crops
Lower cost
Lower maintenance

In another example, combine harvesters also pickup windrows for threshing of grains. In this case, the rotor can be installed to replace a conventional belt pickup. It is not typically used in combination with the conventional pickup but instead replaces it. In this application the benefits and advantages are the same as the baler.

According to a fifth aspect of the invention there is provided an apparatus where the rotor can be used as a bean or vine harvester. There are many applications where crops remain rooted and the rotor would be installed in front of a conveyor belt or other threshing or gather device and the rotor rips the plants out of the soil with roots attached and tosses them up onto a conveyor or shelf. The rotor replaces other devices which are more complex, fragile and require more maintenance. The rotor could also speed up harvest compared to other existing machines.

According to a sixth aspect of the invention there is provided an apparatus with a rotor that replaces several rotating flail machines which strip off vegetables, leaves, fruits, and biomass from standing crops and toss them into bins, conveyors, trailers or other storage system. The rotor could be installed into these harvesting machines as well.

According to a seventh aspect of the invention there is provided an apparatus for lifting a swath comprising a self-propelled machine instead of being pulled by a tractor. In this situation the rotor and accompanying devices are mounted to a self-propelled and motorized farm vehicle such as a swather or tractor and the rotor does not require a hitch, frame or wheels but instead rely on the self-propelled power unit to hold the rotor and provide structure to allow the various adjustments described herein.

In all cases for this category of claims, the intention is to demonstrate that the uniqueness of the tines mounted on a round pipe in a configuration which includes the belt covering a portion of the tines is unique and beneficial. This rotor with these combined features can then be installed into multiple applications for farming.

In some cases the rotor is positioned at an angle other than perpendicular to the direction of travel. This can be a "left" or "right" angle and the angle can vary from 0 to 45 degrees. The more the angle, the more aggressive the outcome but the user can adjust this to suit the field conditions or specific application. The benefit of the angle provides the following outcomes:

The windrow material can be tossed against a deflector plate or curved sheet that manipulates the windrows behavior as it drops to the ground. The more aggressive the angle combined with an adjusted position of the deflector sheet will actually compress the windrow rather than spread it out. It also can simultaneously induce some twisting motion that brings material from the edge or bottom of the windrow to the top or a different position. This induces a kind of mixing action which aids in drying.

If the rotor angle is zero so that the rotor operates perpendicular to direction of travel, a second deflector plate can be adjusted to push the windrow in a manner which causes it to widen. This adjustable feature can also be combined with an adjustment to rotational speed to affect the behavior and physical nature of the windrow as it travels over the rotor and deflects off the plate. A higher rotational speed induces greater velocity to the windrow material, affecting its behavior as it is deflected or not.

The same deflector plate and speed can be adjusted when the rotor angle is not zero and these adjustments can be made in combination with the sheet deflector adjustments and therefore more fine tuning of the manipulation of the windrow is possible.

The deflector plates and baffles used to deflect the windrow's direction of travel after the rotor has lifted and thrown it rearward is a critical feature. The deflectors and baffles are used in other having and harvesting machines but only when the devices moving the crops are operating perpendicular to the windrow. Having the rotor operate at angles other than perpendicular introduces entirely new behaviors in the relationship between the crop and the plates and baffles. This has proved to be very critical in the function and performance. Having a wide range of adjustments is also important as it allows adaptation to different crops and conditions.

The height adjustment is another factor which affects performance in different crops and is a useful feature. This is adjusted by way of the gauge wheels.

Another feature provides that the entire rotor assembly lift by way of hydraulic cylinders and be suspended on the frame. This allows it to avoid contact with windrows if so desired. It also allows the operator to avoid obstacles such as rocks.

The angle of the tines angularly relative to the axis of the rotor is an important feature particularly when combined with the many other adjustable features noted above and provides a different effect relative to the angle of the axis of the rotor relative to the forward direction obtained by the wheel angle adjustment noted below.

While the angle of the rotor relative to the windrow is adjusted by the steering linkage on the wheel axles, there is also a pivoting hitch which has significant importance in being able to change the position of the overall machine when being towed by a tractor. In this case, the hitch angle sets the distance from the tractor driving position laterally to the windrow position and allows the operator to drive beside or straddle the windrow, or combinations thereof with the ability to constantly set the adjustment from the tractor by way of the hydraulic circuit. As the wheel angle is adjusted, the hitch angle also needs adjustment to maintain the center position of the rotor relative to the windrow center line position. Ideal operation allows the rotor to be centered over the windrow and be equidistant whilst not driving over an adjacent windrow with tractor tires. An adjustable hitch angle permits this.

While an adjustable hitch angle and steering tires themselves have been used in multiple applications on many machines before, this specific combination with this unique rotor design is quite original and distinct. This is further emphasized by the outcomes of the machine's capabilities when all of these adjustable parameters are combined.

Preferably the rotor is shaped as a drum so that the lifted crop material in the swath is carried over the top of the drum and dropped onto the ground behind the drum.

Preferably the rotor has a length at least equal to a width of the swath so that the swath widens as it is carried over the top of the rotor and is carried over the top of the rotor without contact with confining elements which direct side edges of the crop inwardly. In this way the rotor acts to drive the crop up over the rotor and spread and fluff the crop up and as well as widening the swath.

Preferably the strip extends continuously along the row in that it has no spaces or openings since this best protects the dried crop and avoids pinching, but it may be formed in separate pieces arranged end to end or overlapping.

Preferably the strip has an inner edge attached to the rotor and is smooth and continuous to the outer edge. The strip is formed of a continuous band of material of the required width to extend to the outer edge from the drum. A rubber material which may have a fabric reinforcement material can be suitable. Formed plastic, metallic trim or other flexible material may also be suitable.

Preferably the rotor comprises a drum which is preferably cylindrical but may be of other shapes such as polygonal and preferably has a diameter in the range 6 to 18 inches.

Preferably the tines of each row are double spring tines of the type typically used on a pickup or harrow and are carried on an elongate pipe mounted on the rotor parallel to the axis of the rotor with the pipes mounted at angularly spaced positions around the axis of the drum. Preferably each elongate pipe is rotatable about an axis longitudinal of the pipe so as to adjust an angle of the tines on the pipe to a radius of the rotor axis.

Preferably each elongate pipe is mounted on the rotor using flanges welded to the pipe and bolted to rotor mounted slides that allow for easy tine angle adjustment.

Preferably a length of the tines is in the range 5 to 8 inches and a width of the strip from the rotor to the outer edge is in the range 4 to 6 inches so that an amount of the tines exposed beyond the outer edge is in the range 4 to 6 inches and the tines are of a length and mounted on the rotor or drum so that the ends of the tines operate at a distance of 1 to 2 inches off the ground. Alternatively the tines can be arranged to engage the ground.

Preferably the rotor speed is relatively high and typically greater than 50 rpm and more preferably in the range between 60-100 rpm. This may be adjustable to higher speeds depending on crop and swath conditions and speed of travel or may be fixed on this range.

In most cases the rotor is mounted so that the axis of the rotor is at right angles to the direction of forward movement.

However in situations where the lifting of the crop is particularly difficult, the drum or rotor may be mounted or adjusted on the frame so that the axis of the rotor is at an angle to a line at right angles to the direction of forward movement, where the angle is in the range 10 to 45 degrees and preferable of the order of 20 degrees.

The design is such that when the machine is pulled along a crop windrow or swath, the rotor including the soft belting and pickup teeth carried thereby are rotated around the axis of the rotor with a hydraulic speed greater than 50 rpm and more preferably adjustable between 60-100 rpm in a direction opposite to ground travel. This drives the crop up over the rotor and spreads and fluffs the crop up and as well as widening the swath. That is, in some embodiments, there are no confining elements or swath boards which direct the edges of the crop inwardly and the rotor has a width at least equal to the swath. In this way the swath is lifted and opened to allow wind and sun to naturally dry the crop before harvesting.

The soft or resilient belting adjacent the rotor acts upon the crop and the swath which is most prone to damage, gently pushing the crop and avoiding ripping and tearing actions, while the pickup teeth projecting beyond the outer edge of the belting run down to 1-2 inches off the ground, picking up the flat wet crop. This belting shielding and pickup teeth combination allows the aggressive part of the machine to pick up the hardest to lift and subsequently hardest to dry portion of windrow, while the belting shielding keeps the crop material from the drum face, teeth coils, and pipes, preventing wrapping of crop material around the drum. The belting also creates some airflow which pushes the crop material rearward from the rotor and further avoids wrapping.

The teeth or tines are formed in rows of double coil tine pickup teeth and are fixed to a pipe carried on the exterior of the rotor. The pipes are mounted at spaced positions around the rotor using flanges welded to the pipe bolted to rotor mounted slides that allow for easy tine angle adjustment. This key design feature of angle adjustable teeth being protected by the rubber belting shielding, makes the machine virtually impervious to wet crop wrapping on it thus solving or reducing a problem no other designer has successfully addressed without higher crop damaging speeds. This allows the machine to be pulled along a swath at an angle up to 45 degrees off of square, that is from a line transverse to the direction of movement. This angle allows extremely flat windrows to be lifted. This angle also allows the swath to be manipulated in multiple different manners with the swath guide boards acting as adjustable baffles and confining elements. The angle also allows the swath to be lifted and moved adjacent to the original position.

The tines typically have a length from the pipe of the order of 6.5 inches long. The machine also has a throat which is 10 ft wide by 24 inches high that does not interfere with crop moving over the machine virtually eliminating plugging. Because of this combination of design features the apparatus can be used extensively in both having and field crop operations, to assist with lifting, shifting, widening and subsequently natural drying of windrows. Field crop and hay crop windrows treated by this machine typically need less post-harvest drying and retain higher feed value qualities.

In one arrangement, the rotor can be mounted very simply as in FIG. 1 and has no adjustments or confining elements. That is, it simply lifts the swath and places it back on the ground. Some time later, which may be minutes, hours or days later, another machine such as a baler or harvester then picks up the now fluffed up swath and the conventional pickup lifts it up off the ground.

In another arrangement, the rotor can be mounted in a frame system such as that shown in FIGS. 4-10 where the rotor also simply lifts the swath and places it back on the ground to be left there for a period of time to dry and become homogeneous. The now fluffy swath awaits the next farm machine to come along. The enhancements of this frame shown in FIGS. 4 to 10 allow for the non-perpendicular angle of the rotor and the use of confining elements, deflector panels, adjustable baffles, etc that also change the behavior of the crop material as it falls back onto the ground. The swath can be controlled so that it is fluffier, but also controlled by these adjustments to be narrower, wider, taller, slightly twisted, etc). A baler or harvester then comes along some hours or days later and picks up the now fluffier swath.

In a yet further arrangement, the rotor is installed on harvesting machines instead of a pickup. The rotor is essentially a pickup so it would replace the pickup and perform the functions of lifting the swath into the harvester. It would not drop it back onto the ground nor perform many of the fluffing and drying functions. The rotor can be mounted for adjustable angles and also have confining elements, deflectors, baffles and so forth to change the flow or path of the crop material as the harvester then grabs onto the material to perform the harvesting functions.

In a yet further arrangement, the rotor can be installed on a frame system to act as a type of stripper or ripping machine for gathering vegetables, fruits or plant materials and dropping them onto a conveyor or other bin system. The frame system can be the represented as in FIG. 11 for self propelled operation or FIGS. 4-10 for pull type operation. The same hitch angle, wheel steering adjustments, confining elements, etc are important.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
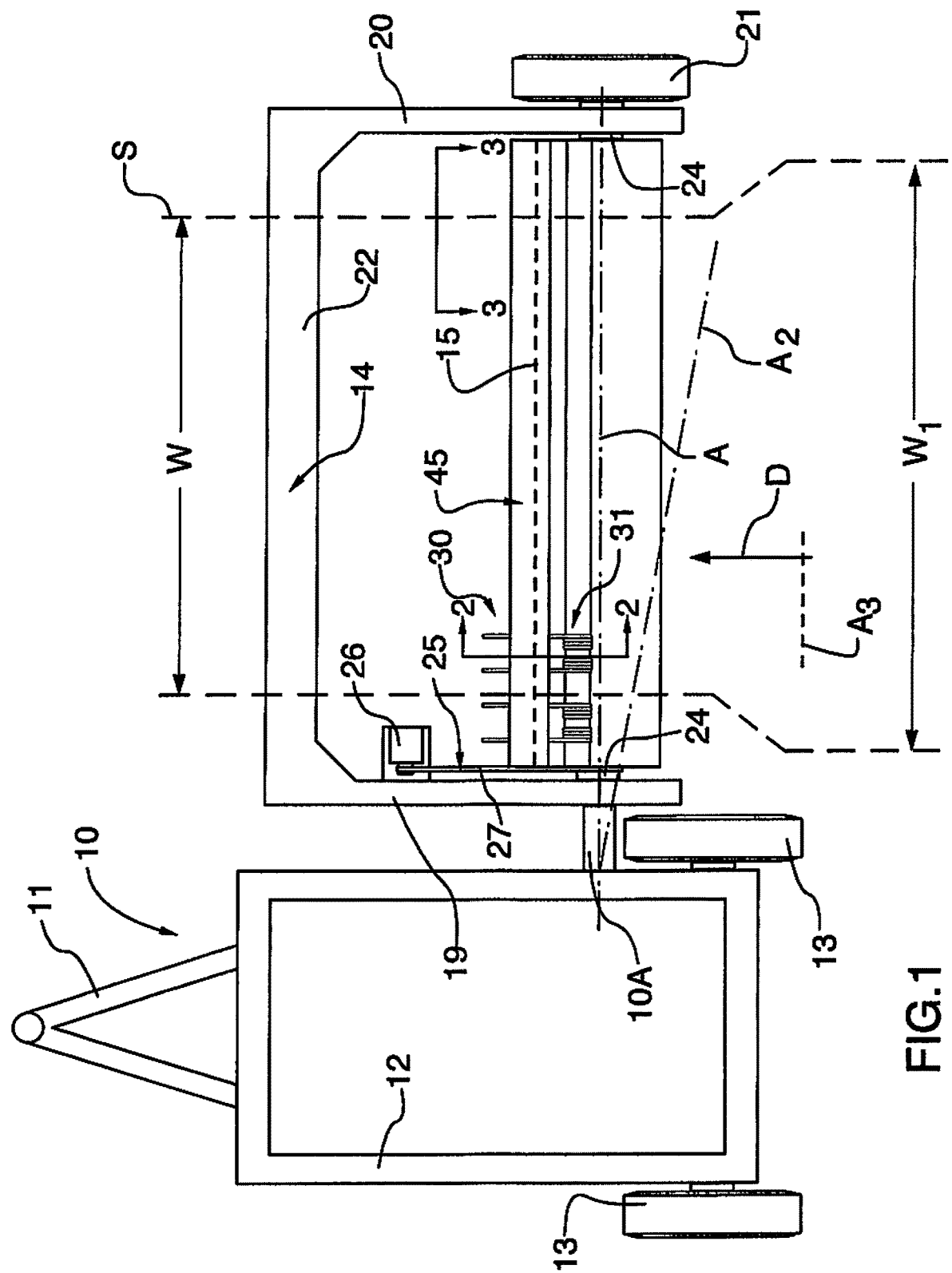
FIG. 1 is a top plan view of an apparatus according to the present invention.

The apparatus for lifting a swath for aeration includes a wheeled frame 10 including a hitch 11 pulling a subframe 12 mounted on ground wheels 13. The subframe carries a rotor frame 14 for movement over the ground. The rotor frame carries a cylindrical drum 15 with an end flange 16 and a peripheral wall 17. The drum is mounted on side arms 19 and 20 which are connected by a front beam 22 which holds the side arms fixed and parallel with the drum spanned therebetween on bearings 24. The arm 20 is carried on an outer wheel 21 and the arm 19 is attached to the side of the frame 10 by a mounting 10A to be carried thereby. The rotor frame is thus supported and pulled by the subframe so as to extend outwardly therefrom so that a tractor pulling the subframe runs along one side of a swath S with the rotor frame extending across the swath with the beam 22 in front of the rotor and above the swath so that the swath passes under the beam and can be lifted by the rotor acting as a pick-up as the rotor moves forwardly across the ground.

The rotor is thus mounted on the frame 14 for rotation around a longitudinal axis A of the rotor or drum 15 arranged generally transversely across the swath. A drive arrangement 25 including a motor 26 and a drive chain 27 acts for driving the drum in rotation. The drive chain can engage the rotor drum itself or the shaft on which the drum is mounted. The motor is suitably mounted on the frame 14 and is typically hydraulic so as to be driven by the hydraulic fluid from the tractor or a power take off driven hydraulic pump. The drum is driven in a direction so that an underside of the rotor adjacent the ground is driven forwardly or opposite to the direction of movement of the ground relative to the drum as the rotor moves forwardly. The rotor speed is greater than 50 rpm and more preferably in the range between 60-100 rpm. This causes the rotor to actively move against the crop and lift the crop so that it passes over the rotor. If a faster ground speed is desirable, the rotor speed must increase relatively. Care must be taken to not reach excessive speeds or crop damage may occur.

The rotor or drum 15 carries a plurality of rows 30 of tines 31 mounted on the rotor 15 for rotation therewith. The tines are conventional pickup tines with a pair of tine fingers 32 and 33 connected by a helical spring 34 where a mid point of the spring is bolted at 35 onto the tine support pipe 36. Thus each row 31 of the tines is mounted extending longitudinally of the rotor 15 with the rows 31 arranged at angularly spaced positions around the rotor 15 with the tines extending generally outwardly from the rotor 15.

Each tine row is carried on the support 36 in the form of an elongate cylindrical pipe 37 mounted on the rotor parallel to the axis of the rotor. The pipe has an outer surface 38 around which the helical spring 34 is wrapped. Each elongate pipe 37 is rotatable about an axis longitudinal of the pipe so as to adjust an angle of the tines on the pipe relative to a radius of the rotor axis A1. The elongate pipes are mounted on the rotor using flanges 39 welded to the pipe at one end and bolted to a bracket 40 for each pipe using bolts 41 mounted on slots in the bracket that allow for easy tine angle adjustment. Simple circular mounting brackets 44 are mounted at spaced positions along the pipe to hold the pipe axis A1 parallel to the drum axis A.

The rotor further carries a plurality of flexible strips 45 of a resilient material with each strip being located in front of a respective one of the rows of tines relative to the direction of rotation. Each strip extends from an inner end 46 bolted onto the outer face of the rotor by bolts 47 to an outer edge 48 of the strip spaced from the rotor surface 38 and spaced inward of an outer end 50 of the tines 32, 33. In this way an outer portion 51 of the tine 32, 33 is exposed beyond the outer edge 48 of the strip 45 and so that an inner portion 52 of the tine is covered by the strip.

Each strip extends fully along the length of the row so as to cover a portion of each tine of the respective row.

Figure 2:
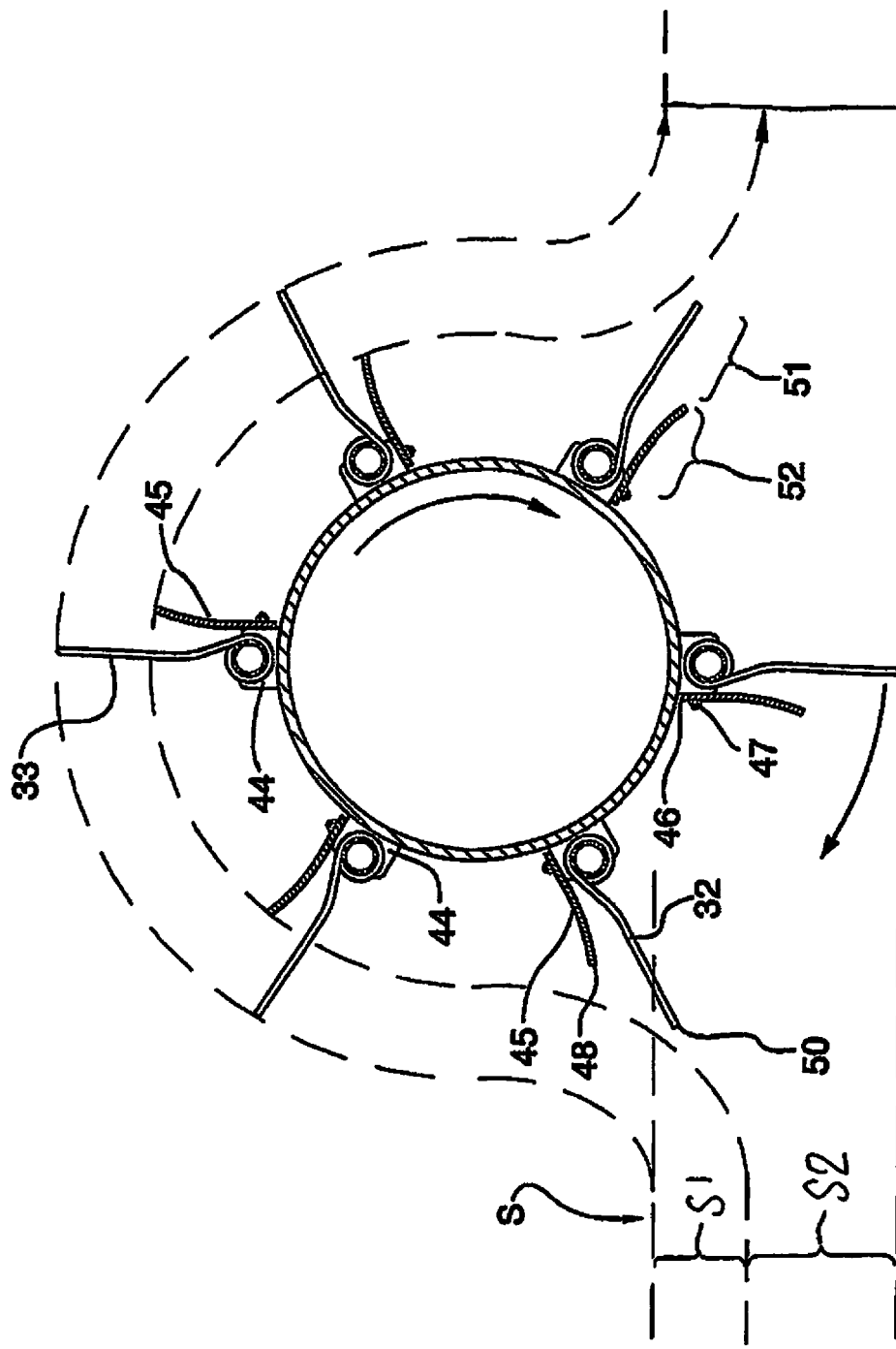
FIG. 2 is a view along the lines 2-2 of FIG. 1 showing the cross-section of the pick-up rotor.
Figure 3:
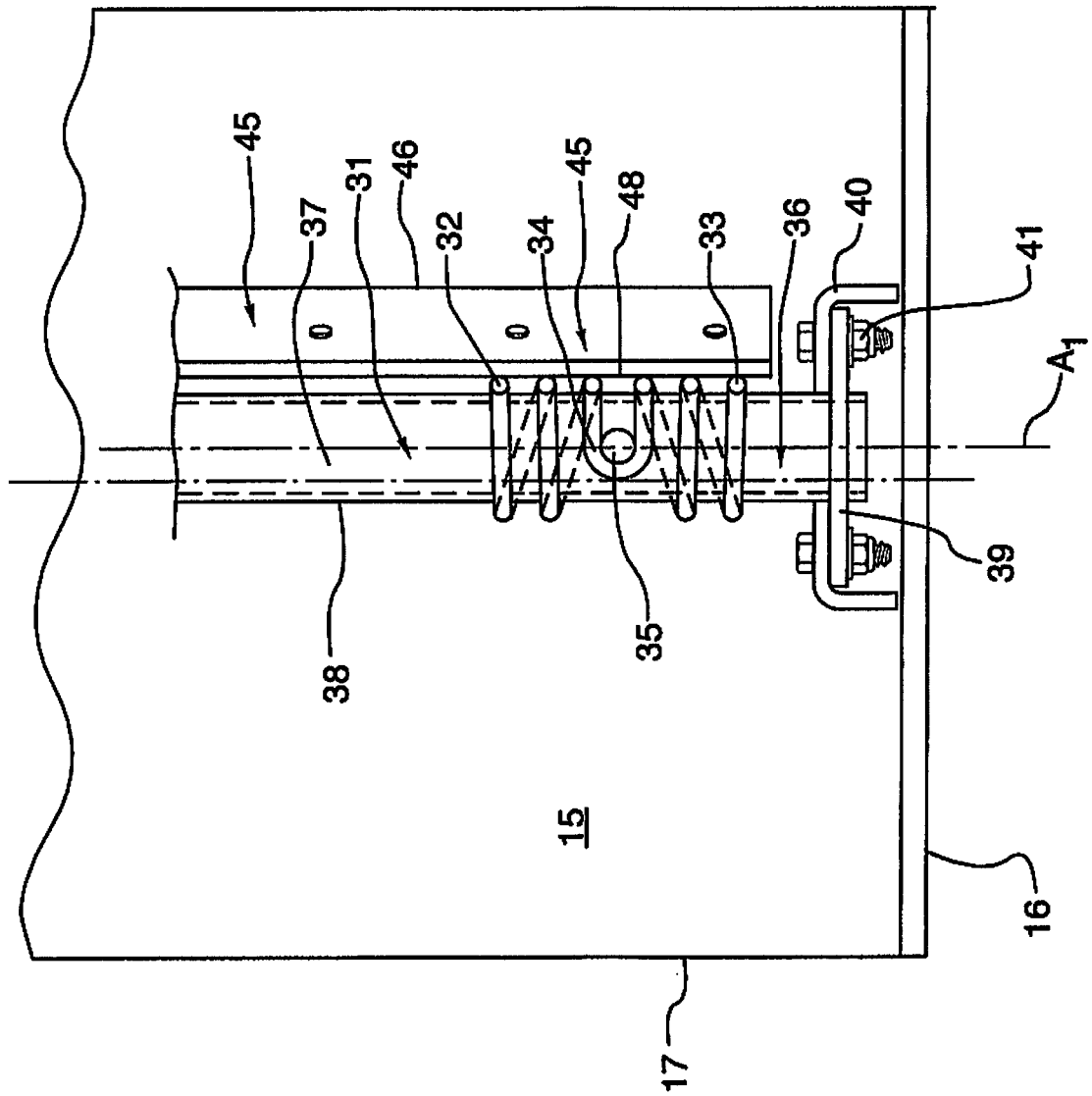
FIG. 3 is a view along the lines 3-3 of FIG. 1 showing a top plan view of one portion of the pick-up rotor sowing the mounting of the pipe and the tines thereon.
Figure 4:
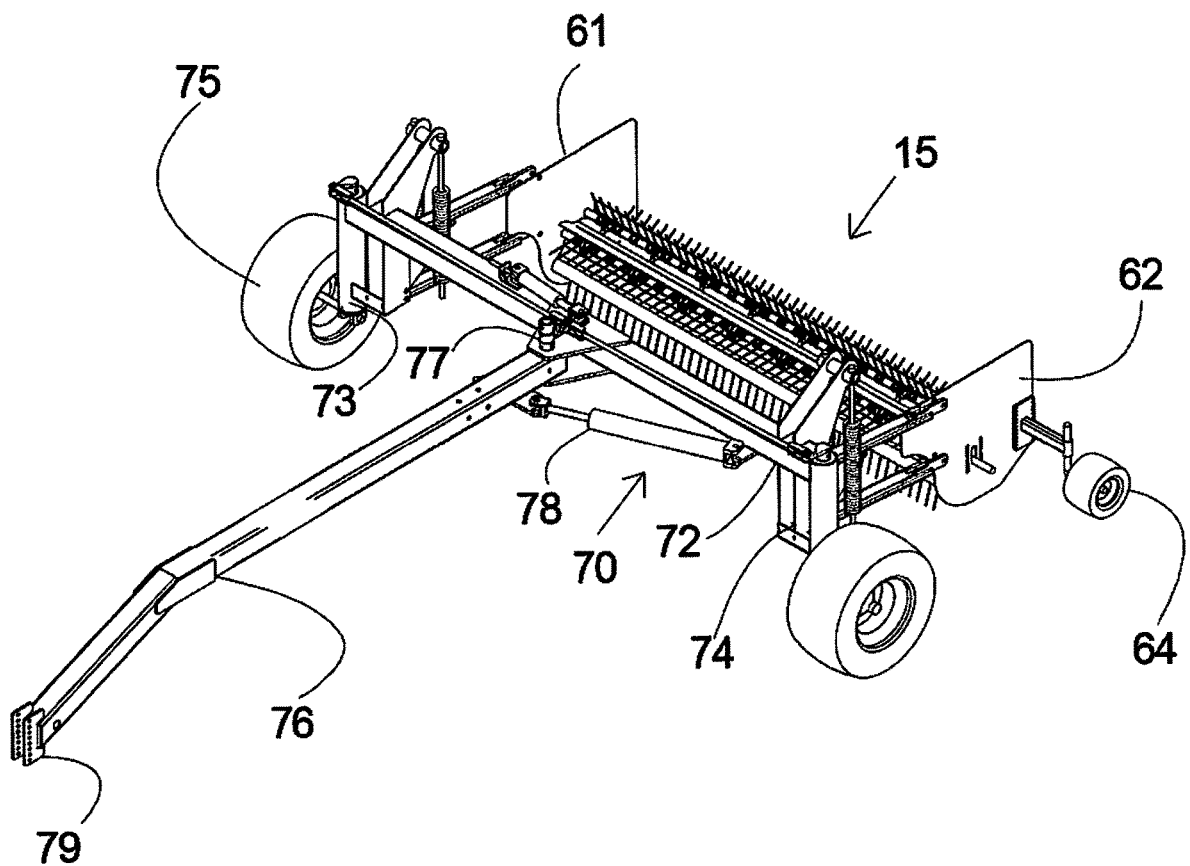
FIG. 4 is an isometric view of a second embodiment of apparatus according to the present invention showing the same rotor arrangement but carried on an alternative frame arrangement where the frame has steerable end wheels and a steerable center hitch, the arrangement being shown with the cover and swath guide boards removed.
Figure 5:
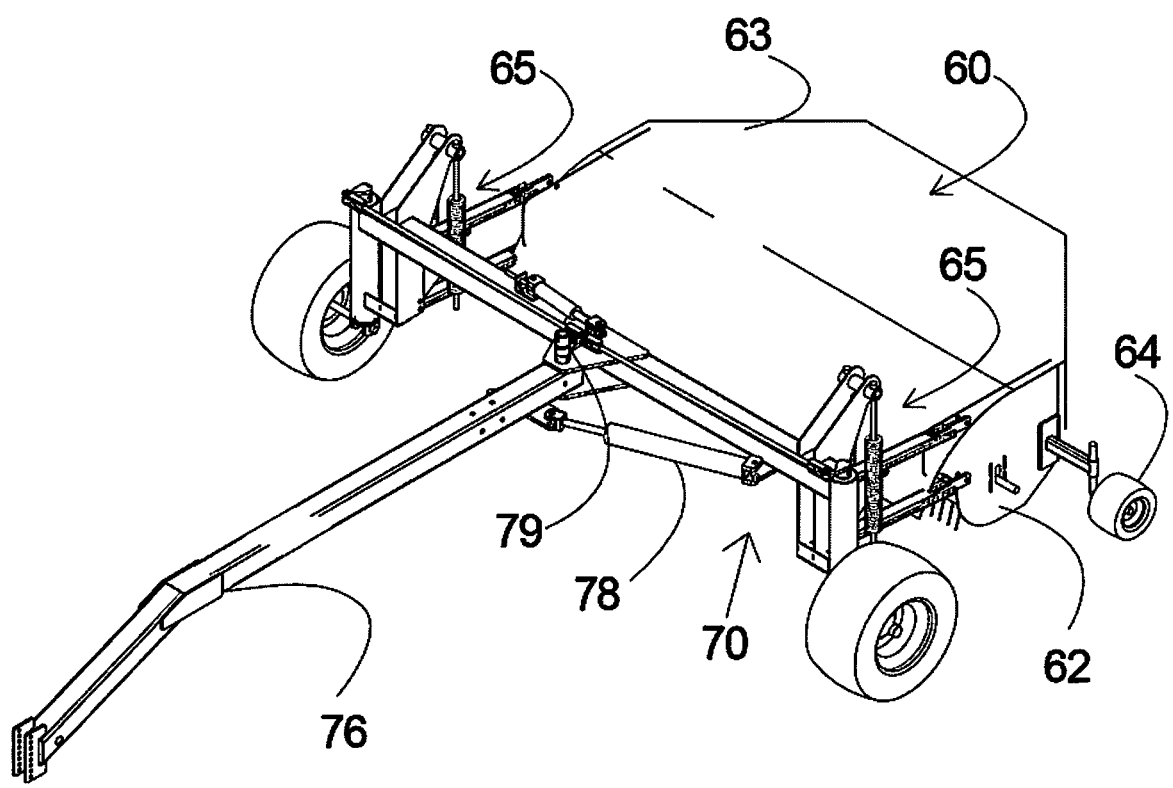
FIG. 5 is an isometric view of the second embodiment of FIG. 4 showing the covers and swath guide boards in place.
Figure 6:
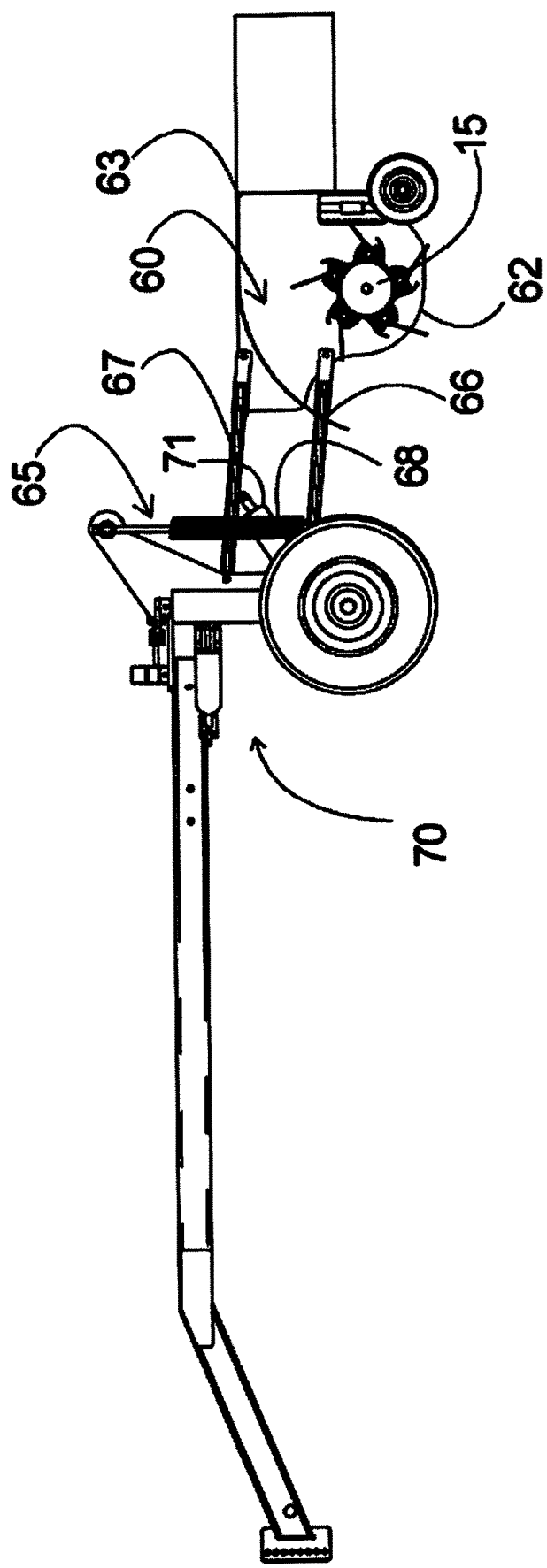
FIG. 6 is a schematic side elevational view of the second embodiment of FIG. 4 showing floating mounting of the cover and rotor on the frame.

In this way so that, as the rotor rotates forwardly relative to the ground, the strip is presented to the swath on the ground in advance of the tines. The tines and strip are arranged such that the outer end portions 51 of the tines pass close to the ground, within 1 to 2 inches as the rotor rotates so as to pick up the crop material from the swath at a position immediately at the ground. The strip covers the inner portion 51 of the tines. As shown in FIG. 2, this causes the tines and the cooperating strip to operate so that the strip 45 engages the crop material at the inner ends of the tines to avoid contact of the inner portion 52 of the tines 32, 33 with the crop material at the top portion S1 of the swath S. in this way, the rotor is arranged so that the lifted crop material in the swath is carried over the top of the rotor and dropped onto the ground behind the rotor.

The strip thus protects the swath from wrapping on the drum and the coil of the inner portion of the tines while the wet material in the portion S2 of the swath is vigorously engaged and lifted by the tines. The rotor is arranged so that the swath is carried over the top of the rotor without contact with confining elements which direct side edges of the crop inwardly. The rotor thus acts to drive the crop up over the rotor and spread and fluff the crop up and as well as widening the swath S from an initial width W to a wider width W1 behind the rotor.

The length of the tines is in the range 5 to 8 inches and a width of the strip from the rotor to the outer edge is in the range 4 to 6 inches so that an amount of the tines exposed beyond the outer edge is in the range 4 to 5.5 inches. This length has been found to provide an effective lifting action from the exposed tines while protecting the top part of the swath. These dimensions are of course crop dependent so that suitable tines and strips can be selected to meet the expected height of the swath in the field.

In FIG. 1, the mounting 10A is arranged so that the axis A of the rotor is at right angles to the direction D of forward movement. However the wheel 21 and the mounting 10A can be adjusted so that the axis A takes up a position A2 at an angle to a line A3 at right angles to the direction of forward movement, where the angle is in the range 10 to 30 degrees and preferable of the order of 20 degrees. In this way the tines move in planes at an angle to the forward direction so that there is a component of movement of the tines from their forwardmost engagement with the crop across the crop toward the end of the rotor at the frame 10. This transverse movement is known to provide an improved pick-up action in cases where the swath is sufficiently compacted to make the pick-up action difficult. This transverse movement can also permit the swath to relocate beside the original position.

Turning now to the second embodiment shown in FIGS. 4 to 10, the same rotor or drum 15 as described above is mounted on a simpler frame construction where the rotor 15 is mounted between two support wheels rather than cantilevered outwardly from a support frame as in FIG. 1. Thus the rotor 15 is carried in a housing 60 with end walls 61 and 62 mounting respective ends of the rotor 15. On top of and bridging the end walls is provided a cover 63 under which the rotor is mounted and the swath passes. The housing 60 is mounted at each side on a castoring gauge wheel 64 adjustable in height to control the height of the housing from the ground and thus the height of the rotor and tines from the ground. The tines can be arranged to contact the ground or to terminate a short distance of perhaps 2 inches from the ground.

The housing is carried at each side on a float construction 65 which allows the housing to float up and down relative to a mounting frame 70. The float construction 65 comprises two parallel links 66 and 67 connected to the frame at the front and to the housing at the rear and are supported by a float spring 68. The housing carried on the gauge wheels is thus drawn across the ground and can float relative to the frame 70 and can be lifted away from the ground on lift cylinders 71 which allow the housing and rotor to be lifted out of engagement with obstacles and for transport.

The frame 70 comprises a cross-beam 72 with depending legs 73 and 74 on which are mounted ground wheels 75 for steering movement about respective vertical steering axes at the end of the beam 72.

A center mounted hitch 76 extends from a bracket 77 on the beam 72 to a forward hitch coupling 79 for attachment to a tractor. The angle of the hitch relative to the beam 72 is adjusted about a vertical axis by a hydraulic cylinder 78.

Figure 7:
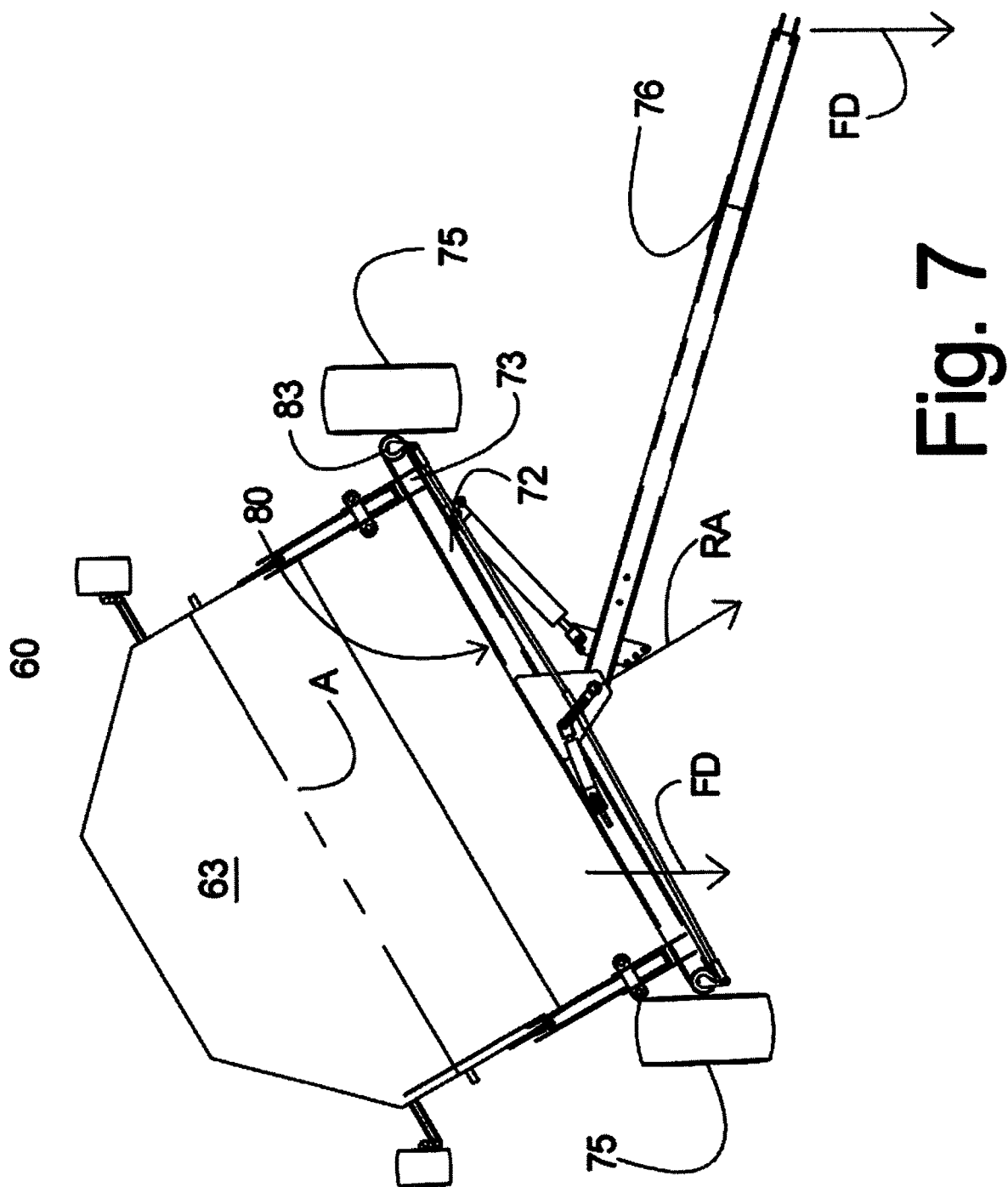
FIG. 7 is a top plan view of the second embodiment of FIG. 4 showing the wheels and hitch in a turned position allowing a line at right angles to the axis of the rotor to run at an angle to the forward direction of the machine.
Figure 8:
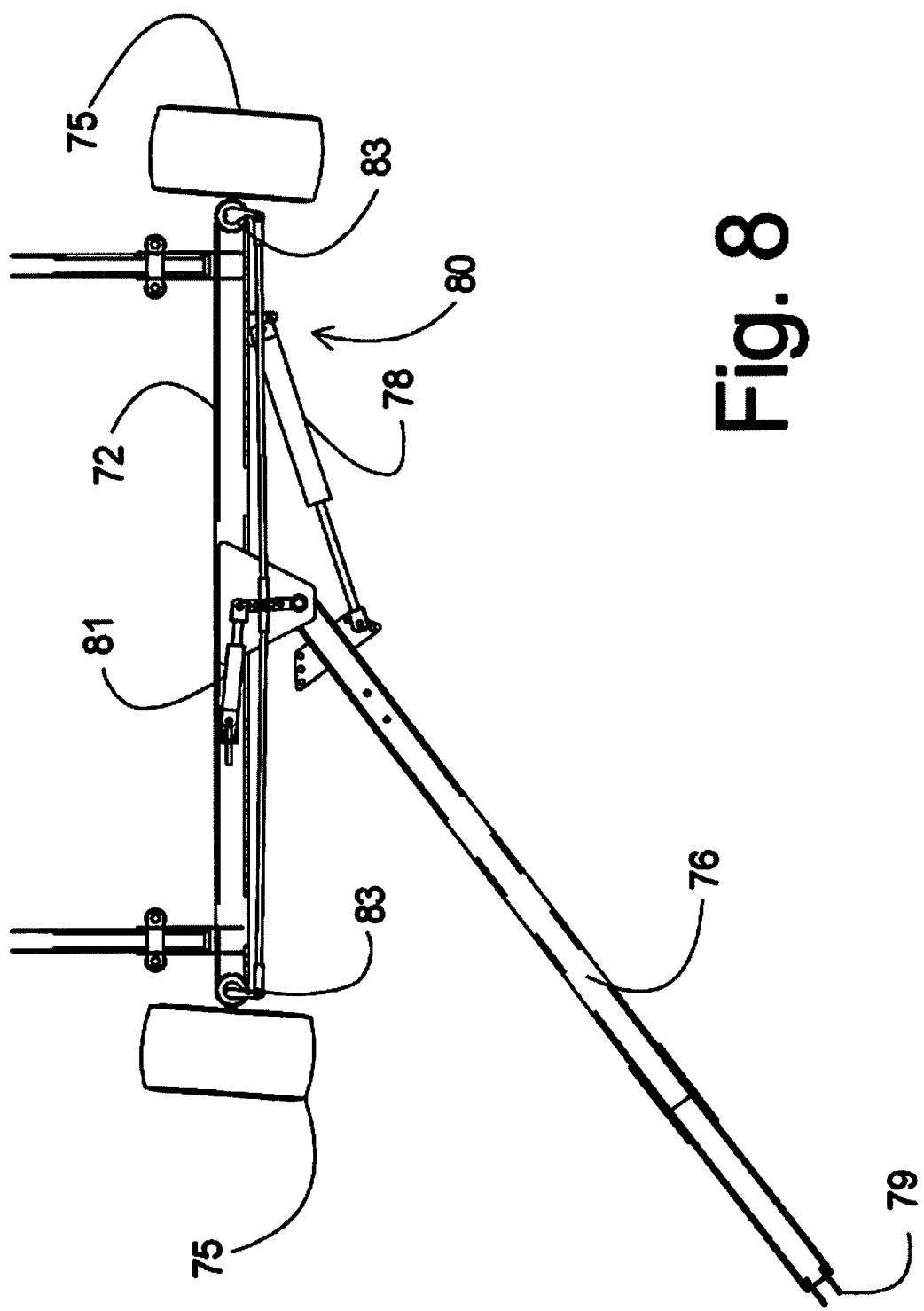
FIG. 8 is a plan view of the second embodiment of FIG. 4 showing the hitch and wheel steering arrangement.
Figure 9:
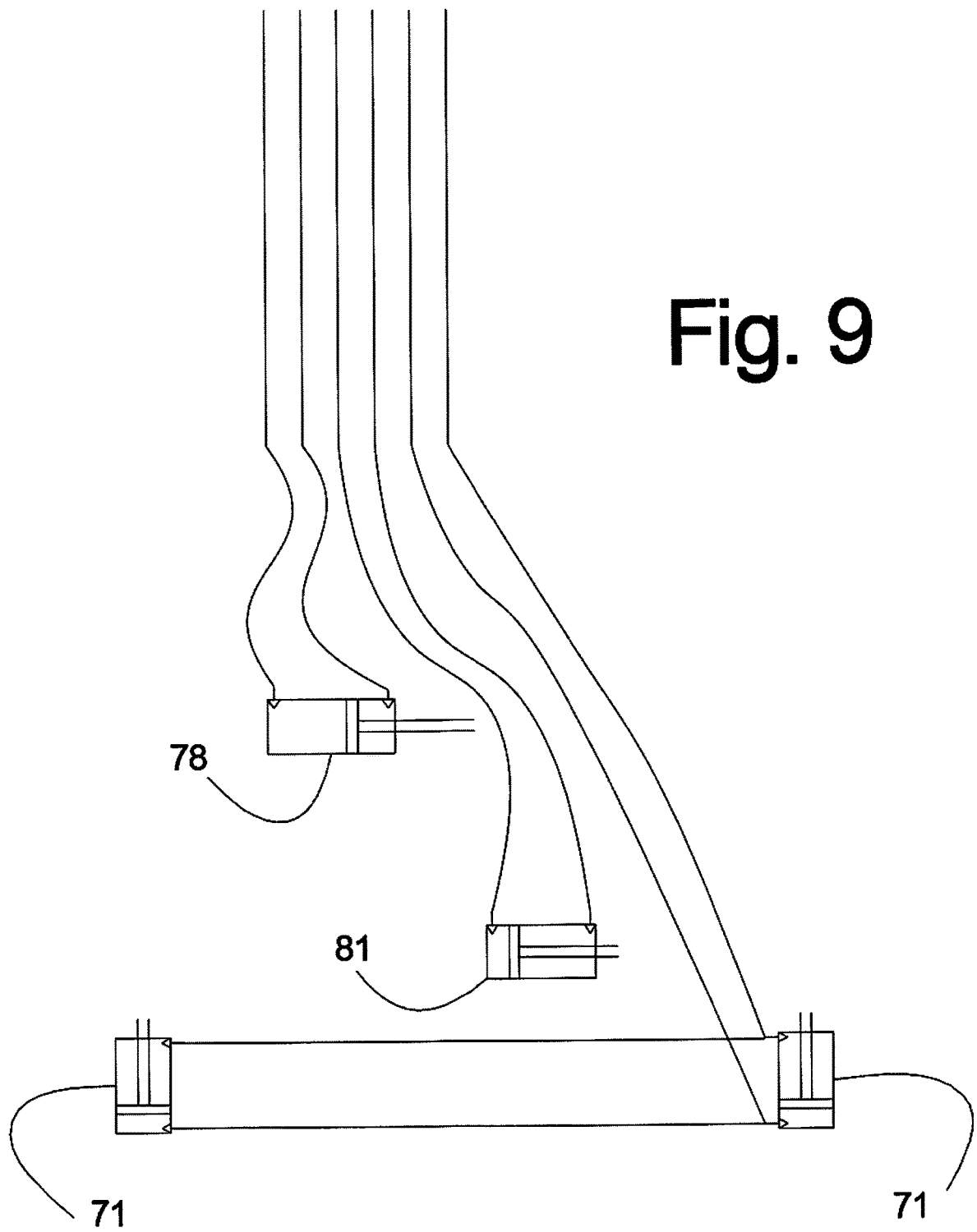
FIG. 9 is a circuit diagram of the second embodiment of FIG. 4 showing control from the cab of the hitch angle cylinder, the rotor lift cylinders and the wheel steering cylinder.

The wheels 75 are steered by a linkage 80 operated by a hydraulic cylinder 81 (FIG. 8) which drives a shaft along the beam 72 to operate respective steering linkages 83 of the respective wheels 75. In this way as shown in FIG. 7, the wheels 75 can be turned to define a forward travel direction FD travelled by the frame and the tractor pulling the frame which is at an angle to the line RA at right angles to the axis A of the rotor. As set out above this angle can be adjusted by steering the wheels 75. At the same time the angle of the hitch 76 to the beam 72 can be adjusted to locate the position of the tractor relative to the mouth of the machine so that the tractor does not run over the swath before it enters the mouth.

In one convenient arrangement for operating the adjustment of the wheel angle and the hitch angle, a hydraulic control arrangement has two circuits, one for operating the cylinder 78 to change the hitch angle during passage across a field and a second circuit for controlling the lift cylinders 71 which also need to be actuated regularly during passage across the field. In order to change the wheel steering angle by operating the cylinder 81, the second circuit operating the lift cylinders is triggered at an end of the movement of the lift cylinders by a sequencing valve so that the second circuit then operates the movement of the cylinder 81 to change the steering angle. Alternatively, if the tractor has three hydraulic circuits the sequencing valve is not required.

Figure 10:
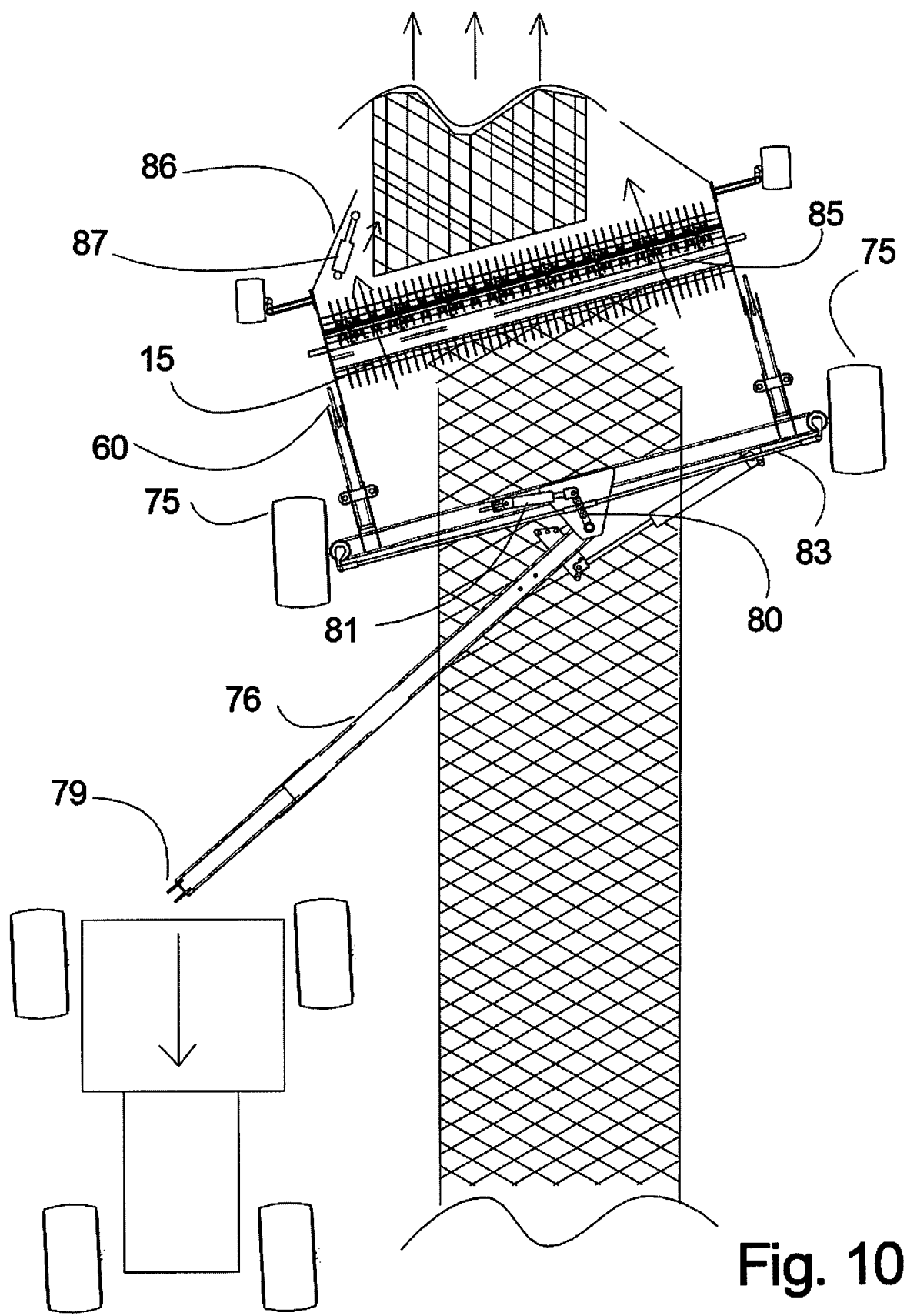
FIG. 10 is a top plan view of the second embodiment of FIG. 4 showing the swath guide boards in place with the rotor at an angle to the forward direction so as to carry the swath sideways into engagement with one of the guide boards so that the sideways movement controlled by the rotor and the pressure on the swath by the guide board act to form the swath into a required construction.

Thus as shown in FIG. 10, the rotor is arranged at an angle that is not perpendicular to the direction of travel so that the swath is carried over the top of the rotor and moved to one side as indicated at 85 and there is provided a swath guide board 86 arranged so that the swath when moved to one side is thrown against the guide board 86 that guides the behavior of the swath as it drops to the ground.

The rotor is arranged so that the swath is carried over the top of the rotor which can then make contact with adjustable swath guide boards 86 or confining elements which deflect the crop material upwardly or downwardly or direct side edges of the crop inwardly or without direction depending on the level of adjustment of the confining elements or boards 86.

The rotor can be arranged at an angle that is not perpendicular to the direction of travel so that the swath is carried over the top of the rotor, with the angle then causing the swath to land in a position that is beside its original position, either rightward or leftward of for example between 1 and 4 feet of distance. The rotor operates to drive the crop up over the rotor and spread and fluff the crop up and as well as, in some cases, narrowing the swath. The rotor speed is adjustable by way of modulating the flow of hydraulic oil to the motor driving the rotor. The position of the swath guide board is adjustable by an electric powered actuator or hydraulic cylinder 87.

The rotor and its accompanying frame elements may be lifted relative to the ground by the hydraulic actuator 71 operable by the second circuit circuit controlled within the tractor operator station.

In the above cases the rotor is positioned at an angle other than perpendicular to the direction of travel. This can be a "left" or "right" angle and the angle can vary from 0 to 45 degrees. The more the angle, the more aggressive the outcome but the user can adjust this to suit the field conditions or specific application. In this way the windrow material is thrown by the rotor against a deflector plate or curved sheet 86 that manipulates the windrows behavior as it drops to the ground. The more aggressive the angle combined with an adjusted position of the deflector sheet 86 will compress the windrow inwardly rather than spread it out. It also can simultaneously induce some twisting motion that brings material from the edge or bottom of the windrow to the top or a different position. This introduces some gentle mixing which aids in drying.

If the rotor angle is zero so that the rotor operates perpendicular to direction of travel, a second deflector plate can be adjusted to push the windrow in a manner which causes it to widen. This adjustable feature can also be combined with an adjustment to rotational speed to affect the behavior and physical nature of the windrow as it travels over the rotor 15 and deflects off the plate 86. A higher rotational speed induces greater velocity and airflow to the windrow material, affecting its behavior as it is deflected or not.

The same deflector plate 86 and speed can be adjusted when the rotor angle is not zero and these adjustments can be made in combination with the sheet deflector adjustments and therefore more fine tuning of the manipulation of the windrow is possible.

Another feature provides that the entire rotor assembly and housing 60 lift by way of hydraulic cylinders 71 and be suspended on the frame. This allows the rotor to avoid contact with windrows if so desired when turning in the field or for transport. It also allows the operator to avoid obstacles such as rocks.

Figure 11:
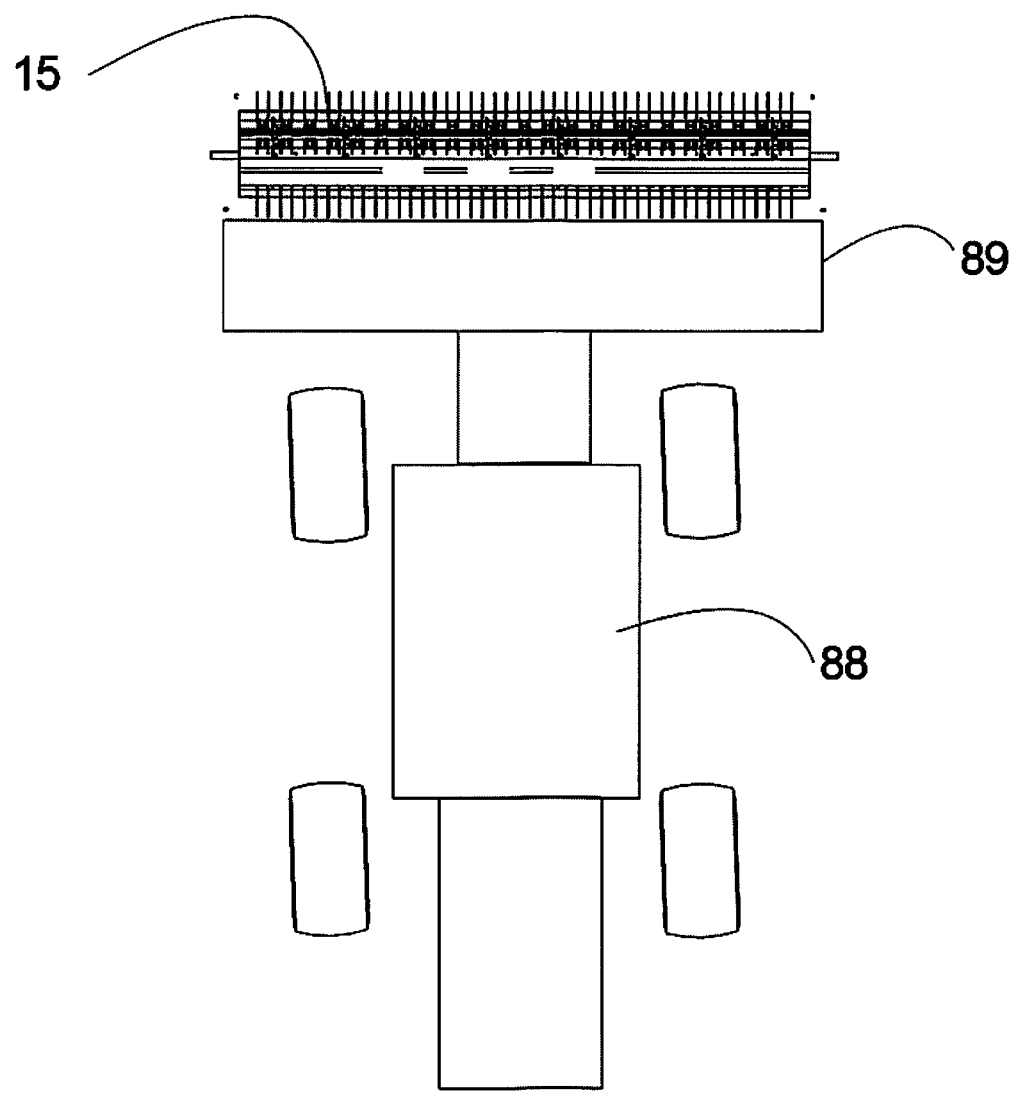
FIG. 11 is a plan view of a fourth embodiment of apparatus according to the present invention showing the same rotor arrangement but carried on a farm implement as a lead component of a pickup for the implement.

The rotor, including the rotor pipe with radial pipes and tines along with belting strip, can be used in other situations rather than just in the swath lifter machine. For example, as shown in FIG. 11, the rotor 15 can be used on a crop harvesting machine such as balers such as round or square baler 88 where the rotor 15 replaces what is commonly referred to as a pickup. The rotor 15 can pickup a windrow and feed the hay or straw into the baler in the same way as a conventional pickup can perform using a feed belt 89.

In a combine harvester, the rotor can be installed to replace a conventional belt pickup. It is not typically used in combination with the conventional pickup but instead replaces it. In this application the benefits and advantages are the same as the baler.

Figure 12:
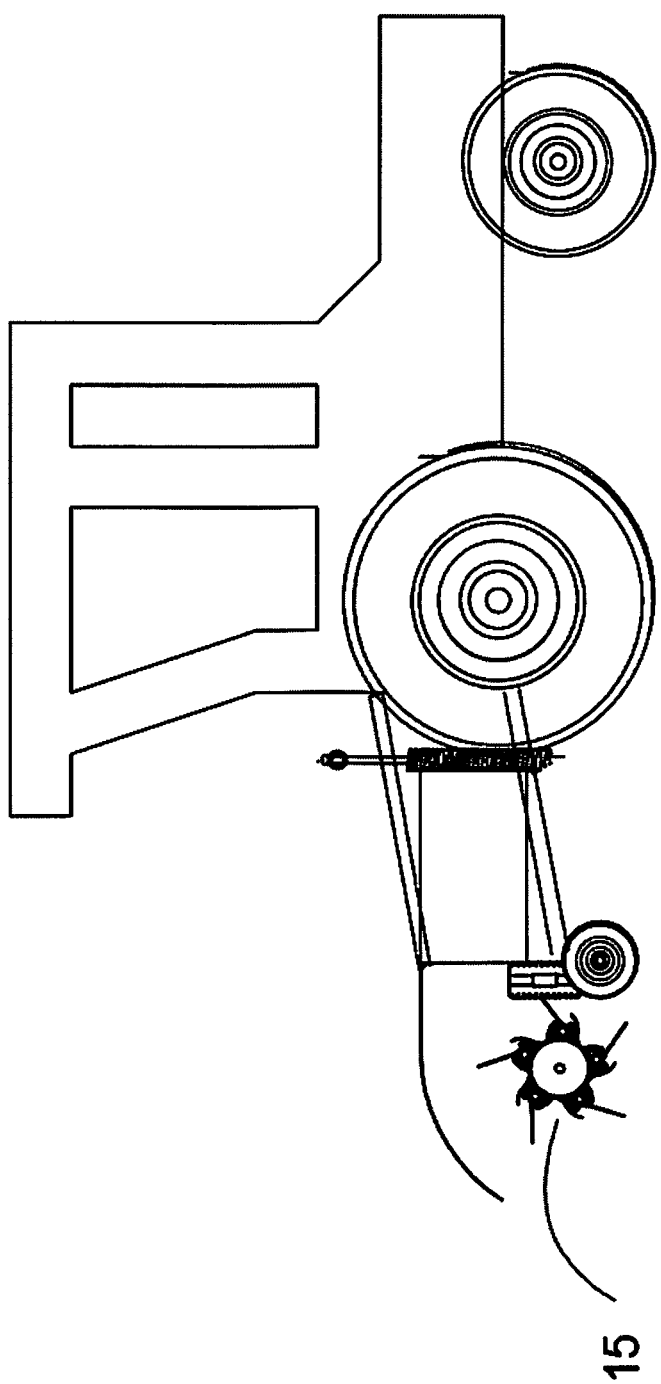
FIG. 12 is a plan view of a seventh embodiment of apparatus according to the present invention showing the same rotor arrangement but carried on a self propelled implement to pickup and lift a swath but not perform any harvesting functions.

In a vegetable, bean, vine or other plant material harvester, the rotor can be installed on a self-propelled or pull-type apparatus to rip and gather plant materials and convey them into storage, as shown in FIG. 12.

Since various modifications can be made in the invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for lifting a swath comprising:
 a wheeled frame for movement over ground carrying a swath of harvested crop material;
 a support rotor mounted on the wheeled frame for rotation around a longitudinal axis of the support rotor with the axis of the support rotor arranged generally transversely across the swath;
 a drive arrangement driving the support rotor in rotation in a direction so that an underside of the support rotor adjacent the ground is driven opposite to the direction of movement of the ground relative to the support rotor as the support rotor moves forwardly;
 a plurality of rows of tines mounted on the support rotor for rotation therewith, each row extending longitudinally of the support rotor with the rows arranged at angularly spaced positions around the support rotor with the tines extending generally outwardly from the support rotor;
 wherein each tine row is carried on an elongate support member mounted on the support rotor parallel to the longitudinal axis of the support rotor;
 wherein each elongate support member is rotatable about an axis longitudinal of the member so as to adjust an angle of the tines on the elongate support member relative to a radius of the longitudinal axis of the support rotor;
 and wherein the support rotor is arranged so that the lifted crop material in the swath is carried over a top of the support rotor;
 a plurality of flexible strips of a resilient material;
 each flexible strip being located angularly in advance of a respective one of the rows of tines relative to said direction of rotation with the flexible strip thus being presented to the swath on the ground in advance of the tines of the respective row of tines;

each flexible strip extending longitudinally along the respective row of tines so as to cover a portion of each tine of the respective row of tines;

each flexible strip extending from the support rotor to an outer edge of the flexible strip spaced from the support rotor and spaced inward of an outer end of the tines of the respective row of tines with an outer portion of each of the tines of the respective row of tines being exposed beyond the outer edge of the flexible strip and with an inner portion of each of the tines of the respective row of tines being covered by the strip.

2. The apparatus according to claim 1 wherein the tines are double spring tines.

3. The apparatus according to claim 1 wherein an angle of the axis of the support rotor relative to a line at right angles to the direction of forward movement is adjustable.

4. The apparatus according to claim 1
wherein the wheeled frame includes a transverse main frame member carried on ground wheels adjacent respective ends thereof so that the axis of the support rotor is parallel to the main frame member;
a hitch member connected to the main frame member at location between the ends thereon and extending from the main frame member to a forward end of the hitch member for attachment to a tractor;
wherein an angle of the hitch member relative to the main frame member is adjustable about a generally upright axis;
wherein the wheels are steerable relative to the main frame member so that an operating angle of the main frame member to a line at right angles to the forward direction is changed between a first operating position and a second operating position;
where, in the first operating position, the main frame member and the axis of the support rotor are arranged by the position of the wheels at a first operating angle inclined to the line at right angles to the forward direction;
where, in the second operating position, the main frame member and the axis of the support rotor are arranged by the position of the wheels at a second operating angle inclined to the line at right angles to the forward direction;
where the first and second operating angles are different;
wherein, at both the first and second angles of the first and second operating positions, the angle of the hitch member is adjusted to maintain a center position of the support rotor at a windrow center line position so that the support rotor is centered over the windrow and be equidistant to sides of the windrow whilst the hitch angle is adjusted to one side of the main frame member so as to avoid driving over the windrow or an adjacent windrow with tractor tires.

5. The apparatus according to claim 1 wherein the support rotor is mounted on respective float arms extending rearwardly from the main frame member and supported by float spring members to allow up and down floating action of the support rotor relative to the main frame member.

6. The apparatus according to claim 5 wherein a height of the support rotor relative to the ground wheels can be adjusted to change a height of the support rotor relative to the ground.

7. The apparatus according to claim 1 wherein there is provided a cover over the support rotor.

8. The apparatus according to claim 1 wherein the support rotor is arranged at an angle that is not perpendicular to the direction of travel so that the swath is carried over the top of the support rotor and moved to one side and there is provided a swath guide board arranged so that the swath when moved to one side is thrown against the guide board that guides the behavior of the swath as it drops to the ground.

9. Apparatus for lifting a swath comprising:
a wheeled frame for movement in a forward direction over ground carrying a swath of harvested crop material;
a support rotor mounted on the wheeled frame for rotation around a longitudinal axis of the support rotor with the axis of the support rotor arranged generally transversely across the swath;
a drive arrangement driving the support rotor in rotation in a direction so that an underside of the rotor adjacent the ground is driven opposite to a direction of movement of the ground relative to the support rotor as the support rotor moves in said forward direction;
a plurality of rows of tines mounted on the support rotor for rotation therewith, each row extending longitudinally of the support rotor with the rows arranged at angularly spaced positions around the support rotor with the tines extending generally outwardly from the support rotor;
wherein the wheeled frame includes a transverse main frame member carried on ground wheels adjacent respective ends thereof so that the axis of the support rotor is parallel to the main frame member;
a hitch member connected to the main frame member at location between the ends thereon and extending from the main frame member to a forward end of the hitch member for attachment to a tractor;
wherein an angle of the hitch member relative to the main frame member is adjustable about a generally upright axis;
wherein the wheels are steerable relative to the main frame member so that an operating angle of the main frame member to a line at right angles to the forward direction is changed between a first operating position and a second operating position;
where, in the first operating position, the main frame member and the axis of the support rotor are arranged by the position of the wheels at a first operating angle inclined to the line at right angles to the forward direction;
where, in the second operating position, the main frame member and the axis of the support rotor are arranged by the position of the wheels at a second operating angle inclined to the line at right angles to the forward direction;
where the first and second operating angles are different;
wherein, at both the first and second angles of the first and second operating positions, the angle of the hitch member is adjusted to maintain a center position of the support rotor at a windrow center line position so that the support rotor is centered over the windrow and be equidistant to sides of the windrow whilst the hitch angle is adjusted to one side of the main frame member so as to avoid driving over the windrow or an adjacent windrow with tractor tires.

10. The apparatus according to claim 9 wherein there is provided a guide board for receiving the crop material from the support rotor wherein the angle of the support rotor and the angle of the guide board are arranged so that the swath is compressed rather than spread out.

11. The apparatus according to claim 10 wherein the angle of the support rotor and the angle of the guide board are arranged to induce some twisting motion into the swath that brings material from the edge or bottom of the swath to the top or a different position.

12. The apparatus according to claim 10 wherein the angle of the support rotor and the guide board position are adjustable.

13. The apparatus according to claim 9 wherein the support rotor is mounted on respective float arms extending rearwardly from the main frame member and supported by float spring members to allow up and down floating action of the support rotor relative to the main frame member.

14. The apparatus according to claim 13 wherein a height of the support rotor relative to the ground wheels can be adjusted to change a height of the support rotor relative to the ground.

15. The apparatus according to claim 9 wherein there is provided a cover over the support rotor.

16. Apparatus comprising:
a farm implement for collecting crop from a swath of harvested crop material;
an apparatus for lifting the swath comprising:
 a wheeled frame for movement over ground carrying the swath;
 a support rotor mounted on the wheeled frame for rotation around a longitudinal axis of the support rotor with the axis of the support rotor arranged generally transversely across the swath;
 a drive arrangement driving the support rotor in rotation in a direction so that an underside of the support rotor adjacent the ground is driven opposite to the direction of movement of the ground relative to the support rotor as the support rotor moves forwardly;
 a plurality of rows of tines mounted on the support rotor for rotation therewith, each row extending longitudinally of the support rotor with the rows arranged at angularly spaced positions around the support rotor with the tines extending generally outwardly from the support rotor;
 wherein the support rotor is arranged at an angle that is not perpendicular to the direction of travel so that the swath is carried over the top of the support rotor and moved to one side;
where the support rotor is mounted in front of the farm implement as the farm implement moves along the swath and is located relative to the farm implement to convey the swath into said farm implement.

17. The apparatus according to claim 16 wherein an angle of the axis of the support rotor relative to a line at right angles to the direction of forward movement is adjustable.

18. The apparatus according to claim 16 wherein the support rotor is mounted on respective float arms extending rearwardly from the main frame member and supported by float spring members to allow up and down floating action of the support rotor relative to the main frame member.

19. The apparatus according to claim 16 wherein a height of the support rotor relative to the ground wheels can be adjusted to change a height of the support rotor relative to the ground.

20. The apparatus according to claim 16 wherein there is provided a cover over the support rotor.

\* \* \* \* \*